United States Patent
MacDuff

(10) Patent No.: US 7,913,958 B2
(45) Date of Patent: Mar. 29, 2011

(54) TWIST CLIP FOR ATTACHING A FIN TO A CONDUIT OF A HYDRONIC HEATING SYSTEM

(76) Inventor: James MacDuff, Victoria (CA)

( * ) Notice: Subject to any disclaimer, the term of this patent is extended or adjusted under 35 U.S.C. 154(b) by 810 days.

(21) Appl. No.: 11/673,023

(22) Filed: Feb. 9, 2007

(65) Prior Publication Data
US 2008/0111034 A1 May 15, 2008

(30) Foreign Application Priority Data
Nov. 15, 2006 (CA) .................................. 2568181

(51) Int. Cl.
- F16L 3/08 (2006.01)
- F24D 19/02 (2006.01)
- F24H 9/06 (2006.01)

(52) U.S. Cl. ........... 248/74.2; 248/302; 165/49; 165/53; 237/69

(58) Field of Classification Search ................. 248/74.2, 248/62, 302, 303, 48.1, 234, 232; 165/49, 165/168, 53; 237/69; 219/531
See application file for complete search history.

(56) References Cited

U.S. PATENT DOCUMENTS

| | | | | |
|---|---|---|---|---|
| 2,613,900 A | * | 10/1952 | Byrnie | 248/68.1 |
| 3,220,680 A | * | 11/1965 | Williams | 248/79 |
| 3,252,583 A | * | 5/1966 | Walther et al. | 211/119 |
| 3,384,158 A | * | 5/1968 | Rothenbach | 165/49 |
| 3,730,355 A | * | 5/1973 | Feldman | 211/59.1 |
| 3,920,208 A | * | 11/1975 | Dowdy et al. | 248/56 |
| 4,476,983 A | * | 10/1984 | Fast | 211/57.1 |
| 4,635,710 A | * | 1/1987 | Shelley | 165/49 |
| 5,131,458 A | * | 7/1992 | Bourne et al. | 165/56 |
| 5,542,603 A | * | 8/1996 | Macduff | 237/69 |
| 6,969,832 B1 | * | 11/2005 | Daughtry, Sr. | 219/531 |
| 2007/0095931 A1 | * | 5/2007 | MacDuff | 237/69 |

FOREIGN PATENT DOCUMENTS

FR 2631427 11/1989

* cited by examiner

*Primary Examiner* — Anita M King

(74) *Attorney, Agent, or Firm* — O'Shea Getz P.C.

(57) ABSTRACT

A twist clip for attaching a heat-radiating fin to a conduit of a hydronic heating system includes an upper gripping member, a lower gripping member connected to the upper member by an upright support member, and a handle portion looping downwardly from the lower gripping member to enable a user to hold the clip and to manually twist the clip to cause the upper and lower gripping members to rotate relative to the fin and conduit such that the fin and conduit are clipped together. This twist clip enables quick and easy attachment of fins to conduits, which greatly reduces the time and effort required to install a hydronic heating system.

11 Claims, 4 Drawing Sheets

TWIST CLIP FOR ATTACHING A FIN TO A CONDUIT OF A HYDRONIC HEATING SYSTEM

CROSS-REFERENCE TO RELATED APPLICATIONS

This application is entitled to the benefit of, and incorporates by reference essential subject matter disclosed in Canadian Application No. 2,568,181 filed on Nov. 15, 2006.

TECHNICAL FIELD

The present invention relates generally to hydronic heating systems and, in particular, to connectors for connecting heat-radiating fins to conduits of a hydronic heating system.

BACKGROUND OF THE INVENTION

Hydronic heating systems for heating floors (radiant floor heating) or walls (radiant wall heating) are well known in the art. Typically, hot water (or other fluid) is circulated through a closed-loop circuit between floor joists or wall studs in order to heat the adjacent floor or wall. It is also known in the art to attach one or more heat-radiating fins to the fluid conduit (or tubing) so as to improve heat transfer efficiency from the hot fluid in the conduit to the floor or wall. These fins, which are typically aluminum, are usually constructed in two symmetrical halves. Along one side of each of these fin halves is a cylindrical trough having a curvature designed to be fitted over or under the conduit.

In the prior art, these heat-radiating fins are usually riveted to the conduits. In a typical fin installation, approximately six rivets have to be driven through pre-pierced holes in each fin in order to attach the fin to the conduit. As will be readily appreciated, the number of rivets required to install all the fins in a complete hydronic heating system for a house or other structure is quite substantial. In other words, installing fins to a conduit in a hydronic heating system is a tedious and time-consuming task. Accordingly, it would be highly desirable to provide an improved connector for quickly and easily connecting a heat-radiating fin to a conduit of a hydronic heating system.

SUMMARY OF THE INVENTION

It is therefore an object of the present invention to provide an improved connector for quickly and easily connecting a fin to a conduit of a hydronic heating system.

Accordingly, the present invention provides a twist clip for attaching a heat-radiating fin to a conduit of a hydronic heating system. The clip includes an upper gripping member and a lower gripping member connected to the upper member by an upright support member. The twist clip also includes a handle portion looping downwardly from the lower gripping member to enable a user to hold the clip and to manually twist the clip to cause the upper and lower gripping members to rotate relative to the fin and conduit such that the fin and conduit are clipped together.

In one embodiment, this twist clip can be manufactured by bending a metal wire. Thus, the twist clip provides a simple and inexpensive alternative to riveting. Installing hydronic heating systems using these twist clips is quicker and easier than with riveting, thus providing cost savings to installer and customer alike.

The present invention further provides a method of attaching a heat-radiating fin to a conduit of a hydronic heating system. The method includes steps of aligning an upper gripping member of a twist clip with a slot in the fin, wherein the slot is parallel to the conduit and then inserting the upper gripping member of the twist clip upwardly through the slot in the fin until a lower gripping member connected to the upper gripping member by an upright support member is approximately level with a bottom of the conduit. The method further includes a step of twisting the clip until the upper and lower gripping members are perpendicular to the conduit to thereby urge the upper gripping member over a top of the conduit and the lower gripping under a bottom of the conduit such that the fin and conduit are clipped together.

The present invention further provides a heat-radiating fin for attachment to a conduit of a hydronic heating system, the fin comprising a thin and wide heat-radiating surface having a plurality of parallel apertures, a curved trough disposed longitudinally along one side of the fin, the trough being sized and shaped to fit half the outside surface of the conduit, the fin further comprising at least one slot disposed between the trough and the parallel apertures for receiving a clip.

The present invention further provides a hydronic heating system having a length of tubing defining a conduit within which a heated fluid can be circulated. The system includes first and second heat-radiating fins attached side by side to the tubing by first and second twist clips. The fins have slots as described above to receive the clips, also described above.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF PREFERRED EMBODIMENTS

In general, and as will be elaborated below, the present invention provides a twist clip for attaching one or more heat-radiating fins to a fluid conduit. The twist clip can be made by bending a metal wire so that it has an upper gripping member with a flared end for being urged over the top of the conduit and a lower gripping member for being urged under the conduit. The lower gripping member loops downwardly to form a handle portion that enables a user to twist the clip. Using this twist clip, fins can be quickly and easily connected to conduits. The twist clip is inserted upwardly through a slot in the fin and then twisted approximately ninety degrees about a vertical axis so that the upper and lower members rotate over and under the conduit, respectively, so as to secure the fins to the conduit. The fins can be removed by reversing this two-step installation procedure, that is, by twisting the clip ninety degrees and then extracting it downwardly through the slot in the fin to thereby release the fin from the conduit. The twist clip thus provides a simple and inexpensive alternative to riveting. Installing fins with these twist clips is quicker than with rivets, thus saving time for the installer, which correlates to a substantial cost savings to the customer. Embodiments of this invention will now be described in greater detail below, with reference to the accompanying figures.

Figure 1:
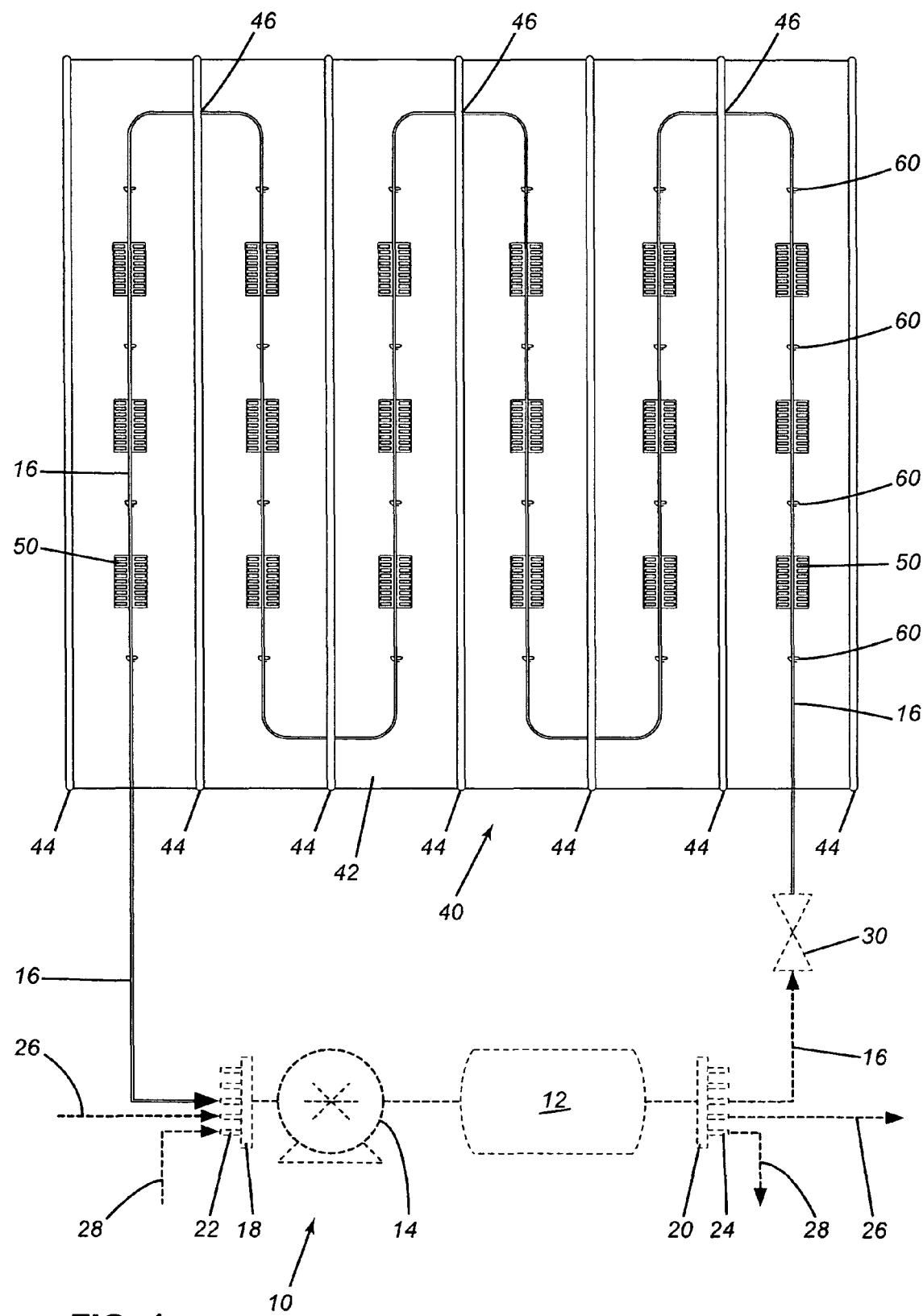
FIG. 1 is a plan view of a hydronic heating system having heat-radiating fins attached to the conduit as an example of a system in which twist clips in accordance with an embodiment of the present invention can be utilized.

FIG. 1 is a schematic plan view of a hydronic heating system, generally designated by reference numeral 10, in accordance with an embodiment of the invention. As shown in FIG. 1, the hydronic heating system 10 transfers radiant heat from a fluid heated by a boiler 12 or other heater for heating the fluid, e.g., water. A pump 14 can be located upstream or downstream of the boiler 12, although, as is known in the art, the system will perform more efficiently if the pump is located upstream of the boiler, as shown in FIG. 1. The boiler 12 and the pump 14 can be separate units, as shown, or different subcomponents of the same unit.

As shown in FIG. 1, the pump 14 circulates the heated fluid through a tubing that defines a conduit 16. In one embodiment, the conduit 16 is made of a composite tubing which includes plastic and aluminum components to prevent the intrusion of atmospheric oxygen into the heating fluid, which can corrode boiler parts and even attack the plastic tubing at elevated temperatures. This type of composite tubing is well known and commercially available from a number of suppliers.

As shown in FIG. 1, the hydronic heating system 10 may optionally include a return manifold 18 and a distribution manifold 20. The return manifold 18 has a plurality of inlet ports 22 and the distribution manifold 20 has a plurality of outlet ports 24 for connecting to other conduits 26, 28 that convey the heated fluid to other heating zones. These manifolds 18, 20 therefore permit several heating circuits (or "heating loops") to be connected to a single boiler loop.

The hydronic heating system 10 typically includes a zone valve 30 for regulating the fluid flow through the conduit 16. The zone valve 30 is controlled by a thermostat (not shown), which opens the zone valve 30 when the thermostat demands heat and closes the zone valve 30 when heat is no longer required. Typically, the thermostat also controls the boiler 12 and pump 14.

As shown in FIG. 1, the conduit 16 loops back and forth under a floor 42 of a zone 40 and runs between and generally parallel to the floor joists 44. In other words, the conduit 16 passes through the "inter-joist spaces" beneath the floor 42. As shown, the tubing is pulled through holes 46 drilled in ends of the joists 44 to enable the tubing to be extended into an adjacent inter-joist space.

A plurality of heat-radiating fins 50 (or fin assemblies having two or more fins or fin halves) which promote heat transfer from the tubing/conduit 16, are connected to the tubing 16 at predefined intervals, as described in Applicant's U.S. Pat. No. 5,542,603 (MacDuff) entitled HYDRONIC HEATING SYSTEM which is hereby incorporated by reference.

As shown in FIG. 1, the hydronic heating system 10 further includes a plurality of hangers 60 as described in U.S. patent application Ser. No. 11/249,947 (MacDuff) entitled A HYDRONIC HEATING SYSTEM, HANGER FOR TUBING AND METHOD OF USING SAME TO INSTALL THE HYDRONIC HEATING SYSTEM, which is hereby incorporated by reference. The hangers 60 suspend the tubing (conduit) 16 a predetermined distance beneath an underside of the floor 42 in order to provide uniform heat transfer to the floor 42 and to thus preclude the creation of any unwanted hot spots on the floor 42. It should be expressly understood that the distribution and spacing of the hangers 60 or the heat-radiating fins 50, or fin assemblies 50, shown schematically in FIG. 1 are not intended to reflect a distribution and spacing that would actually be used to suspend the tubing.

Although FIG. 1 illustrates a hydronic heating system applied to a floor supported by floor joists through which holes may be bored, the hydronic heating system is equally adapted to be used with floors constructed with open or "space joist" systems, well known in the art, stressed-skin panels, reinforced concrete, or any other flooring system that presents a relatively flat floor underside into which fasteners can be driven to suspend the tubing.

Figure 2:
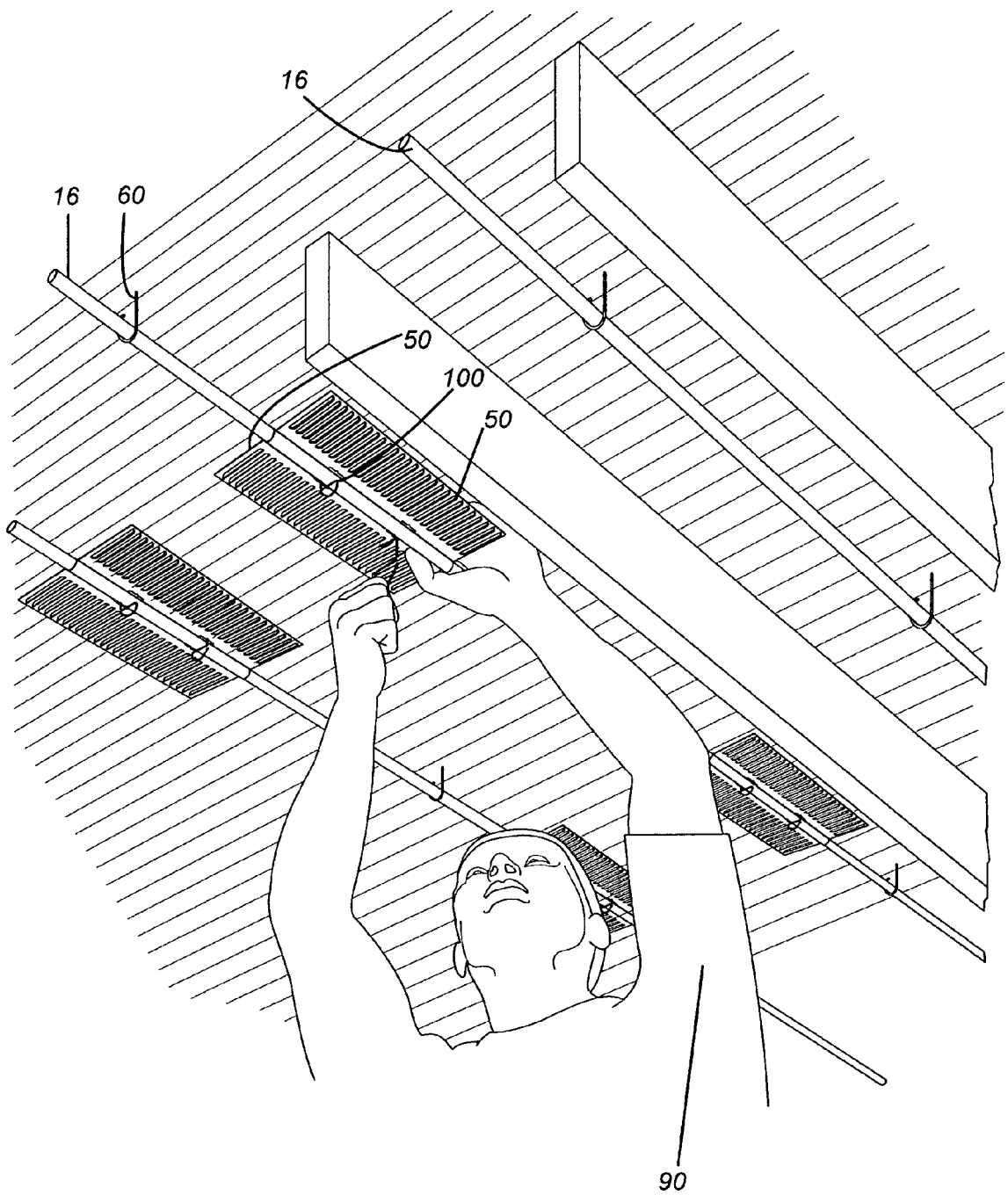
FIG. 2 is an isometric perspective view of a user installing fins to a conduit using twist clips in accordance with an embodiment of the present invention.

FIGS. 2-6 illustrate a twist clip 100 in accordance with an embodiment of the present invention for attaching one or more heat-radiating fins 50 to the conduit 16. As shown in FIG. 2, a user (or installer) 90 attaches the fins 50 to the conduit 16 between the joists 44 at regular intervals along the length of the conduit 16. The conduit 16 is suspended by hangers 60, also spaced at regular intervals between the joists 44 along the length of the conduit 16. As shown in FIG. 2, it is preferable to attach the fins 50 to the conduit 16 using two twist clips 100 per fin 50 (or per pair of side-by-side fins 50), as will be elaborated below.

Figure 3:
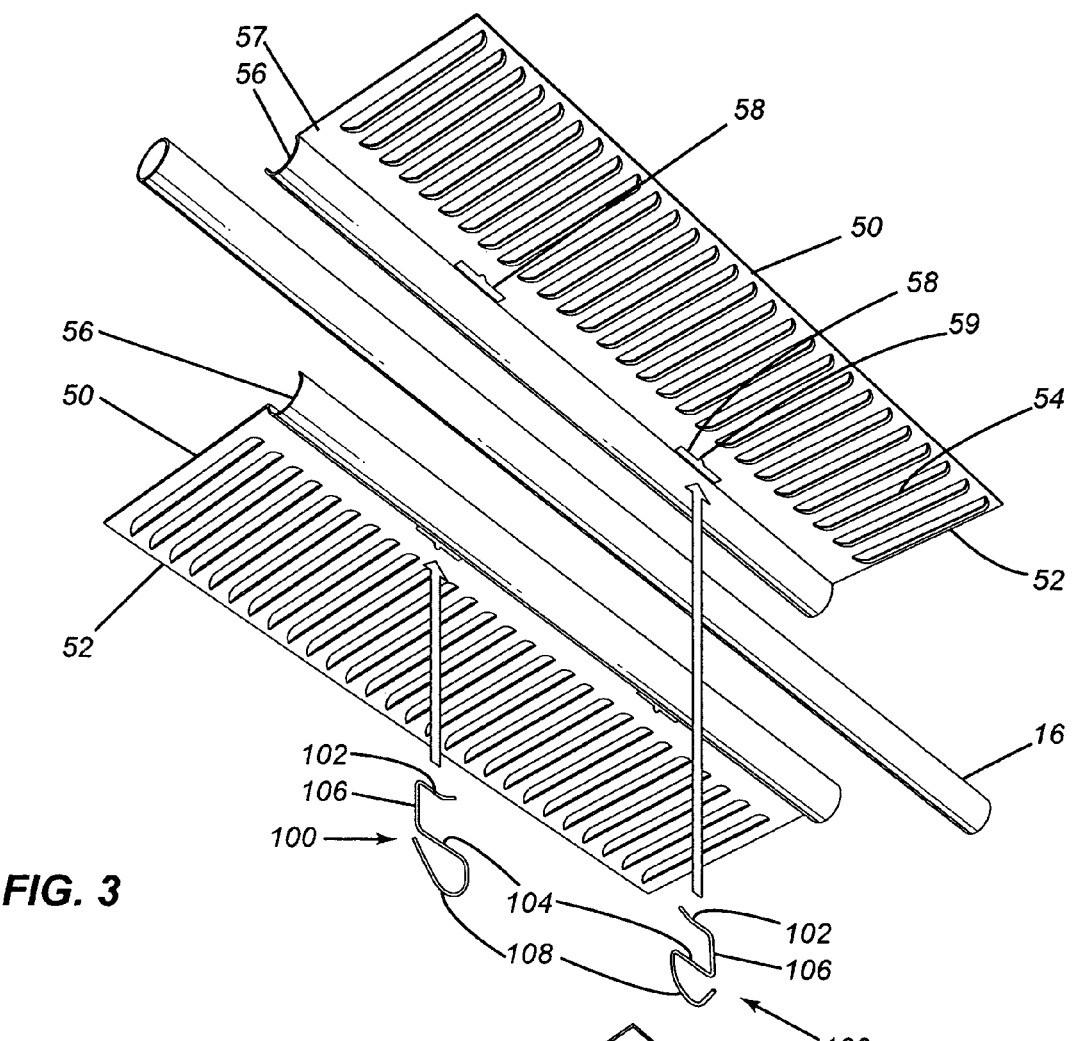
FIG. 3 is an exploded view of a conduit, a pair of fins and a pair of twist clips used to attach the fins to the conduit, showing in particular the alignment of the clips with respective slots in the fins.

As shown in FIG. 3, two fins 50 are preferably attached side by side to the conduit 16 to constitute a "fin assembly". For the purposes of this specification, the expression "fin" shall be construed as encompassing either a solitary fin or a fin assembly having two (or more) fins assembled together. In the preferred embodiment shown in FIG. 3, the fin 50 is effectively a fin half, i.e. it is designed to be connected to the conduit in a side-by-side configuration with another symmetrical fin to constitute a complete fin (or fin assembly). Thus, the fin 50 shown in FIG. 3 has only a single heat-radiating surface 52 that extends from one side of the conduit 16. The heat-radiating surface 52 is a thin and wide surface, which is preferably made of aluminum or other metal. The heat-radiating surface 52 has a plurality of parallel apertures 54, which are preferably slots transverse to the conduit 16, as illustrated in the figures.

As shown in FIG. 3, the fin 50 includes a curved trough 56 disposed longitudinally along one side 57 of the fin 50. The trough 56 is sized and shaped to fit an outside surface of the conduit 16. In other words, the curved trough 56 is a cylindrical half shell having a radius of curvature equal to that of the tubing/conduit. As depicted in FIG. 3, the fins 50 are preferably identical (which simplifies manufacturing) and are installed such that one of the fins 50 has its trough 56 facing up while the other fin 50 has its trough 56 facing down. When the fins 50 are attached side by side to the conduit 16, the two troughs 56 substantially surround the conduit 16 such that the clips 100 only contact the troughs 56, thereby clamping or sandwiching the conduit 16 between the troughs 56.

As shown in FIG. 3, the fin 50 further includes at least one slot 58 disposed between the trough 56 and the parallel apertures 54 through which the clip 100 is inserted. The slot 58 includes a notch 59 for restraining the clip 100 when the clip 100 is twisted into an operative position perpendicular to the conduit 16. The notch 59 is preferably semicircular with a diameter equal to a diameter of the upright support member 106. Operation of the notch will be described in greater detail below.

Although the fin 50 shown in FIG. 3 represents the preferred design, in an alternative embodiment the fin could be a single (i.e. integral) piece having heat-radiating surfaces extending on both sides of the conduit. In this alternative embodiment, the double-sided fin 50 would be placed beneath or on top of the conduit, thus leaving either the top or the underside of the conduit exposed such that one part of the clip would directly contact the conduit (whereas, in the preferred arrangement involving two separate fins, the clip does not directly contact the conduit).

Furthermore, it should be understood that the size, dimensions, and shape of the fin and its apertures can be varied for specific applications or simply as a result of optimization. For example, the fins need not be rectangular, nor do the apertures have to be arranged transversely.

As further depicted in FIG. 3, the fins 50 are attached to the conduit 16 using a pair twist clips 100 (although it should be appreciated that in other variants, only a single twist clip could be used or, alternatively, three or more twist clips could be used).

Figure 4:
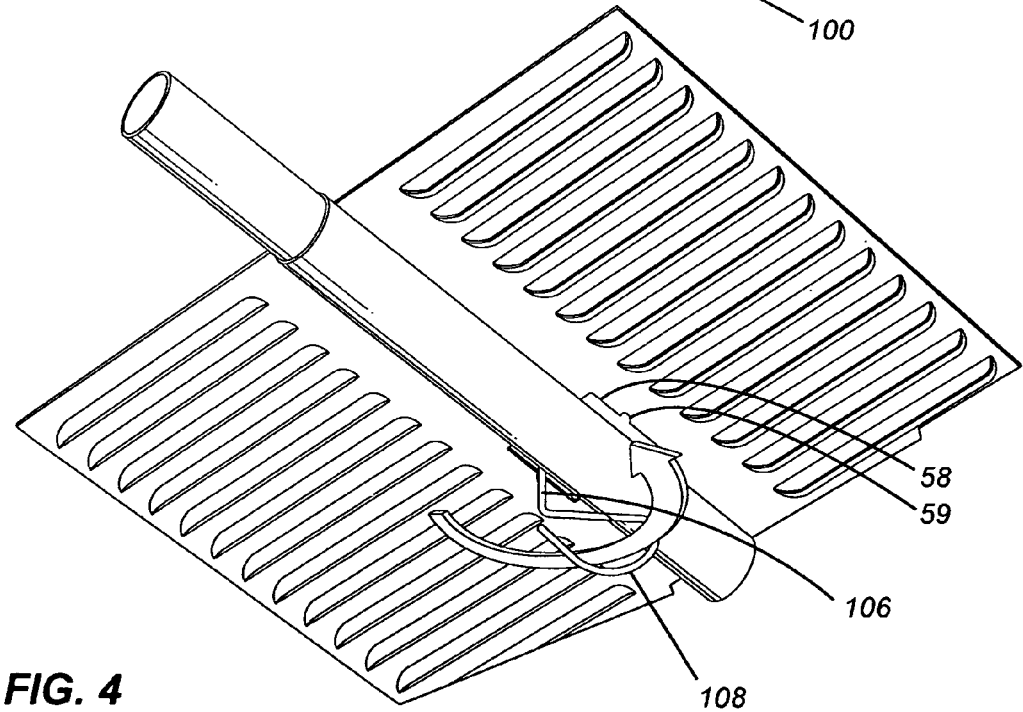
FIG. 4 is an isometric perspective view showing how a twist clip is rotated to clip the fins to the conduit.
Figure 5:
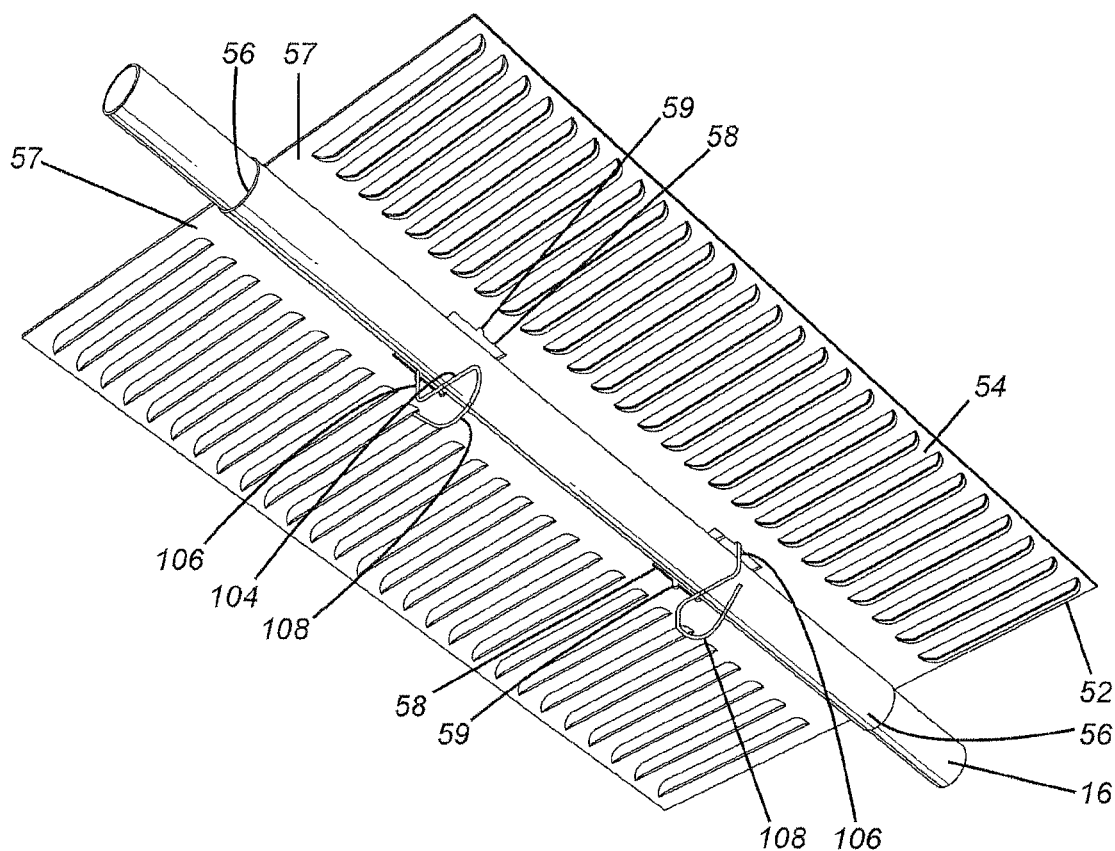
FIG. 5 is an isometric perspective view of a pair of fins attached to a conduit by a pair of twist clips that have been twisted into their operative position perpendicular to the conduit.

As illustrated in FIGS. 3-6, each twist clip 100 is designed to enable the user/installer 90 to quickly and easily attach the heat-radiating fin(s) 50 to the conduit 16 of a hydronic heating system 10. In accordance with the preferred embodiment shown in FIGS. 3-6, each clip 100 has an upper gripping member 102, a lower gripping member 104 connected to the upper member 102 by an upright support member 106. The clip 100 also has a handle portion 108 looping downwardly from the lower gripping member 104 to enable the user to hold the clip 100 and to manually twist the clip as shown in FIG. 4) to cause the upper and lower gripping members 102, 104 to rotate relative to the fin 50 and conduit 16 such that the fin 50 and conduit 16 are clipped together (as shown in FIG. 5).

Preferably, the upper gripping member 102, lower gripping member 104, upright support member 106 and handle portion 108 are integrally formed from a single length of metal wire. The metal wire can be readily bent using known metal bending instruments to form the clip, thus providing a simple and inexpensive means of manufacturing the clip. Preferably, the metal wire has a diameter of about 2 mm.

Figure 6:
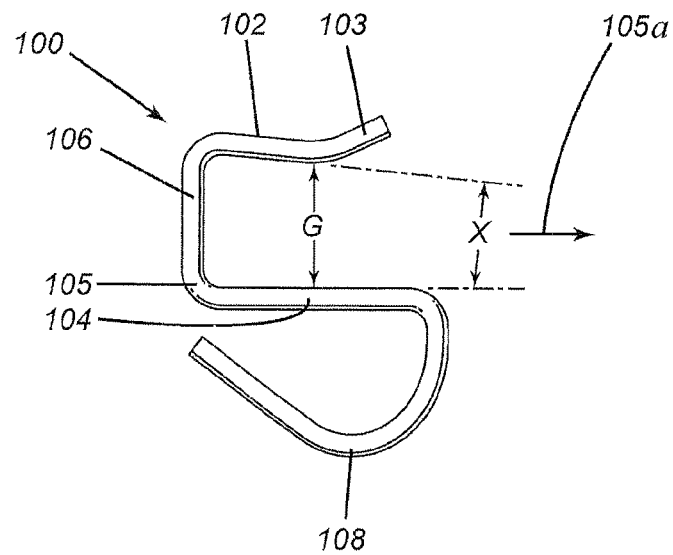
FIG. 6 is a side elevation view of a twist clip in accordance with an embodiment of the present invention.

In the preferred embodiment of the twist clip shown in FIG. 6, the upper gripping member 102 and the lower gripping member 104 converge (slightly) in a direction away from the upright support member 106 (designated by arrow 105*a*). As shown in FIG. 6, the angle of convergence X is quite shallow such when the clip 100 is urged over the conduit 16, the upper and lower members 102, 104 of the clip 100 will spread out. Being elastically deformed, the upper and lower members 102, 104 of the clip 100 are biased back toward the slightly converged posture, thus providing a small gripping force on the conduit 16. In the preferred embodiment (again with reference to FIG. 6), the upper gripping member 102 can have an outwardly flared end 103 to facilitate placement of the clip 100 onto the conduit 16. As further shown in FIG. 6, between the upper gripping member 102 and the lower gripping member 104 is a gap G that is preferably less than an outer diameter of the conduit 16. Having a gap G smaller than the conduit diameter further ensures that the clip snugly grips the fin to the conduit.

As shown in FIGS. 3-6, the handle portion 108 loops from the lower gripping member 104 back into close proximity with a point 105 where the lower gripping member 104 connects to (or "becomes" in the case of a unitary metal wire clip) the upright support member 106. The handle portion 108 could be formed or bent differently to provide a handle for the user. The illustrated handle portion 108 represents the preferred design because it is simple to manufacture (easy to bend into that shape), uses a minimal amount of wire, and is structurally rigid enough to enable the user to hold and twist the clip without causing any discomfort to the user or without causing the clip itself to deflect undesirably.

The present invention also provides a method of attaching a heat-radiating fin to a conduit of a hydronic heating system. This method will now be described with reference to FIGS. 2-5. As shown in FIG. 2, the method entails attaching fins to a conduit that is suspended between joists of a floor to be heated.

As shown in FIG. 3, the method includes a step of aligning the upper gripping member 102 of each twist clip 100 with the slot 58 in the fin 50. As noted above, the slot 58 is parallel to the conduit 16. As suggested by the large arrows in FIG. 3, a subsequent step of the method involves the user inserting the upper gripping member 102 of the twist clip 100 upwardly through the slot 58 in the fin 50 until the lower gripping member 104 connected to the upper gripping member 102 by the upright support member 106 is approximately level with a bottom of the conduit 16. As shown in FIG. 4, a subsequent step of the method entails the user twisting the clip 100 (as indicated by the large curved arrow in FIG. 4) until the upper and lower gripping members 102, 104 are perpendicular to the conduit 16 to thereby urge the upper gripping member 102 over a top of the conduit 16 and the lower gripping member 104 under a bottom of the conduit 16 such that the fin 50 and conduit 16 are clipped together. FIG. 5 shows the end result of the method, i.e. two twist clips 100 holding a pair of fins 50 in the operative position perpendicular to the conduit 16.

In a preferred embodiment of the method, the clip 100 is twisted or rotated until the upright support member 106 engages the semicircular notch 59 in the slot 58. As was mentioned above, the diameter of the notch 59 is equal to, or slightly larger than, the diameter of the upright support member 106 so that the upright support member 106 catches in the notch 59, thus locking the clip 100 in the operative position perpendicular to the conduit 16.

This method can be applied for attaching a single clip, or preferably, for attaching two clips as shown in the accompanying figures. Therefore, when two clips are to attached, the method can be summarized as follows: (i) placing the curved trough of the first fin on the top of the conduit so that the first fin extends outwardly from a first side of the conduit; (ii) placing the curved trough of the second fin on the bottom of the conduit so that the second fin extends outwardly from a second side of the conduit; (iii) aligning and inserting the first twist clip with the slot in the first fin and then twisting the first clip to fix the first fin to the conduit; and (iv) aligning and inserting the second twist clip with the slot in the second fin and then twisting the second clip to fix the second fin to the conduit.

The embodiments of the invention described above are intended to be exemplary only. The scope of the invention is therefore intended to be limited solely by the appended claims.

What is claimed is:

1. A method of attaching a heat-radiating fin to a conduit of a hydronic heating system, the method comprising steps of:
    aligning an upper gripping member of a twist clip with a slot in the fin, wherein the slot is parallel to the conduit;
    inserting the upper gripping member of the twist clip upwardly through the slot in the fin until a lower gripping member connected to the upper gripping member by an upright support member is approximately level with a bottom of the conduit; and twisting the clip until the upper and lower gripping members are perpendicular to the conduit to thereby urge the upper gripping member over a top of the conduit and the lower gripping member under a bottom of the conduit such that the fin and conduit are clipped together.

2. The method as claimed in claim 1 wherein the step of twisting the clip comprises rotating the clip until the upright support member engages a semicircular notch in the slot, the notch having a diameter equal to a diameter of the upright support member.

3. The method as claimed in claim 1 further comprising a prior step of manufacturing the twist clip by bending a single length of metal wire.

4. The method as claimed in claim 1 comprising steps of:

placing a curved trough of a first fin on a top of the conduit so that the first fin extends outwardly from a first side of the conduit;

placing a curved trough of a second fin on a bottom of the conduit so that the second fin extends outwardly from a second side of the conduit;

aligning and inserting a first twist clip with a slot in the first fin and then twisting the first clip to fix the first fin to the conduit; and aligning and inserting a second twist clip with a slot in the second fin and then twisting the second clip to fix the second fin to the conduit.

5. A hydronic heating system comprising:

a length of tubing defining a conduit within which a heated fluid can be circulated; and first and second heat-radiating fins attached side by side to the tubing by first and second twist clips, each clip having:

an upper gripping member;

a lower gripping member connected to the upper member by an upright support member; and a handle portion looping downwardly from the lower gripping member to enable a user to hold the clip and to manually twist the clip to cause the upper and lower gripping members to rotate relative to the fin and conduit such that the fin and conduit are clipped together.

6. The hydronic heating system as claimed in claim 5 wherein the upper gripping member, the lower gripping member, the upright support member, and the handle portion are integrally formed from a single length of metal wire.

7. The hydronic heating system as claimed in claim 5 wherein the upper gripping member and the lower gripping member converge in a direction away from the upright support member, the upper gripping member having an outwardly flared end to facilitate placement of the clip onto the conduit.

8. The hydronic heating system as claimed in claim 5 wherein a gap between the upper gripping member and the lower gripping member is less than an outer diameter of the conduit.

9. The hydronic heating system as claimed in claim 5 wherein the handle portion loops from the lower gripping member back to into close proximity with a point where the lower gripping member connects to the upright support member.

10. The hydronic heating system as claimed in claim 5 wherein the first and second fins include curved troughs for engaging, respectively, a top and a bottom of the conduit, such that:

the upper gripping member fixes the curved trough of the first fin to the top of the conduit; and the lower gripping member fixes the curved trough of the second fin to the bottom of the conduit.

11. The hydronic heating system as claimed in claim 5 wherein each of the fins comprises a generally rectangular body having a plurality of parallel apertures, a curved trough disposed longitudinally along one side of the fin, the trough being sized and shaped to fit an outside surface of the conduit, each fin further comprising at least one slot disposed between the trough and the parallel apertures for receiving a clip, the slot having a notch for restraining the clip when the clip is twisted into an operative position perpendicular to the conduit.

* * * * *